United States Patent
Knight et al.

(10) Patent No.: US 7,770,592 B2
(45) Date of Patent: Aug. 10, 2010

(54) VALVE WITH FREEZE-PROOF HEATED VALVE SEAT

(75) Inventors: Steven R. Knight, Portland, CT (US); Timothy P. Neal, Harwinton, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 347 days.

(21) Appl. No.: 11/777,603

(22) Filed: Jul. 13, 2007

(65) Prior Publication Data

US 2008/0053530 A1 Mar. 6, 2008

Related U.S. Application Data

(60) Provisional application No. 60/807,224, filed on Jul. 13, 2006.

(51) Int. Cl.
*F16K 49/00* (2006.01)
*F24J 3/00* (2006.01)

(52) U.S. Cl. .......................... 137/1; 137/341

(58) Field of Classification Search ............... 137/334, 137/341, 1; 429/4, 29, 34
See application file for complete search history.

(56) References Cited

U.S. PATENT DOCUMENTS

| | | | |
|---|---|---|---|
| 2,556,557 A | | 6/1951 | Schweitzer, Jr. |
| 2,777,463 A | * | 1/1957 | Boswell ............... 137/341 |
| 3,575,199 A | * | 4/1971 | Beattie ............... 137/341 |
| 3,580,267 A | * | 5/1971 | Baker ............... 137/341 |
| 6,296,007 B1 | | 10/2001 | Cifune |
| 7,546,848 B2 | * | 6/2009 | Koenekamp ......... 137/341 |
| 2004/0197625 A1 | | 10/2004 | Deshpande et al. |
| 2006/0115700 A1 | | 6/2006 | Kotani et al. |
| 2006/0131531 A1 | | 6/2006 | Ohmori et al. |
| 2007/0141419 A1 | | 6/2007 | Lee et al. |

FOREIGN PATENT DOCUMENTS

| | | |
|---|---|---|
| DE | 19801387 | 7/1999 |
| EP | 1213451 | 6/2002 |
| FR | 2851315 | 8/2004 |

OTHER PUBLICATIONS

Search Report for application No. PCT/US2007/073477, dated Nov. 30, 2007.

* cited by examiner

*Primary Examiner*—Kevin L Lee
(74) *Attorney, Agent, or Firm*—Renner, Otto, Boisselle & Sklar LLP

(57) ABSTRACT

A valve comprises a valve body having a fluid inlet and fluid outlet, a valve seat located in the valve body between the fluid inlet and a fluid outlet, a valve member movable towards and away from the valve seat for controlling the flow of fluid from the fluid inlet to the fluid outlet, and a PTC heater in thermal contact with the valve seat for heating the valve seat. The heater is integrated in the valve in a manner where the valve seat is used as an electrical conductor to facilitate operation and assembly of the valve, and a unique valve construction is provided for enabling self-draining to avoid accumulation of water or other liquid in the valve that might negatively impact performance of the valve.

10 Claims, 4 Drawing Sheets

VALVE WITH FREEZE-PROOF HEATED VALVE SEAT

RELATED APPLICATION DATA

This application claims the benefit of U.S. Provisional Application No. 60/807,224 filed Jul. 13, 2006, which is hereby incorporated herein by reference in its entirety.

FIELD OF THE INVENTION

The herein described invention relates generally to freeze-proof valves and more particularly to valves with freeze-proof valve seats used in fuel cell systems.

BACKGROUND OF THE INVENTION

Fuel cell systems heretofore have used drain valves for controlling the draining of water to a drain. A problem arises when the fuel cell system shuts down under ambient freezing conditions. Water frozen on the valve seat may cause the valve not to open and/or close properly, and thereby interfere with proper operation of the system.

According to U.S. Published Patent Application No. 2007/0141419, heating wires heretofore have been wound around the drain valves thereby to heat the valve prior to re-start of the fuel cell system. This was considered undesirable because of the requirement for additional heating means to thaw ice in the drain valve and the substantial amount of thawing time and thawing power needed. The solution set forth in said published patent application was to improve the draining ability of the valve by providing a valve structure comprising an inlet pipe having an elliptical valve seat, an outlet pipe parallel to the inlet pipe, and a valve body connecting the inlet pipe and outlet pipe such that the inlet pipe is in communication with the outlet pipe, with the valve body being inclined with respect to the inlet pipe at a predetermined angle.

SUMMARY OF THE INVENTION

The present invention provides several inventive features operative separately or in combination to provide a freeze-proof valve, specifically a freeze-proof drain and/or vent valve having particular application in fuel cell systems. These features include the utilization of a positive temperature coefficient (PTC) heating element for heating the valve in an energy efficient manner that also avoids overheating of the valve, the integration of a heater into a valve in a manner where a valve seat is used as an electrical conductor to facilitate operation and assembly of the valve, the use of a heater internal to the valve for direct heating of the valve seat, and a unique valve construction that provides for self-draining to avoid accumulation of water or other liquid in the valve that might negatively impact performance of the valve.

More particularly, a valve according to the invention generally comprises a valve body having a fluid inlet and fluid outlet, a valve seat located in the valve body between the fluid inlet and a fluid outlet, a valve member movable towards and away from the valve seat for controlling the flow of fluid from the fluid inlet to the fluid outlet, and a heater in thermal contact with the valve seat for heating the valve seat.

More particularly, the heater may include one or more PTC heater elements.

The heater may be in electrically conductive contact with the valve seat.

The heater may be biased against the valve seat by a resilient member.

The resilient member may be in electrically conductive contact with the PTC heater.

The heater, valve body and resilient member may form part of an electrical circuit for powering the PTC heater.

The valve seat may be secured within a chamber in the valve body, and the valve body may be made of an electrically nonconductive material.

The valve seat may have an inlet passage connected to the fluid inlet, and heater may include one or more heater elements surrounding the inlet passage.

The valve seat may have an upwardly protruding portion terminating at a valve seat surface surrounding an upper end of the inlet passage, the valve seat surface may be located at a higher elevation than the bottom of an annular well surrounding the upwardly protruding portion, and the well may be connected by a drain passage to the fluid outlet.

The valve seat and valve body may be formed as separate pieces, and the valve body may be formed from an electrically nonconductive material.

The heater may be disposed interiorly of the valve body.

The heater may be contiguous with the valve seat.

The valve body may have a chamber, the valve seat may be formed as a separate element secured in the chamber, and the heater may be disposed within the chamber between the valve seat and the valve body.

The foregoing features may be utilized individually or with any one or more features of the invention.

The present invention also provides a fuel cell system comprising a valve as above set forth, and a method of using such valve to apply heat to a valve seat by means of a heater located within the valve, as above set forth.

Further features of the invention will become apparent from the following detailed description when considered in conjunction with the drawings.

DETAILED DESCRIPTION

Figure 1:
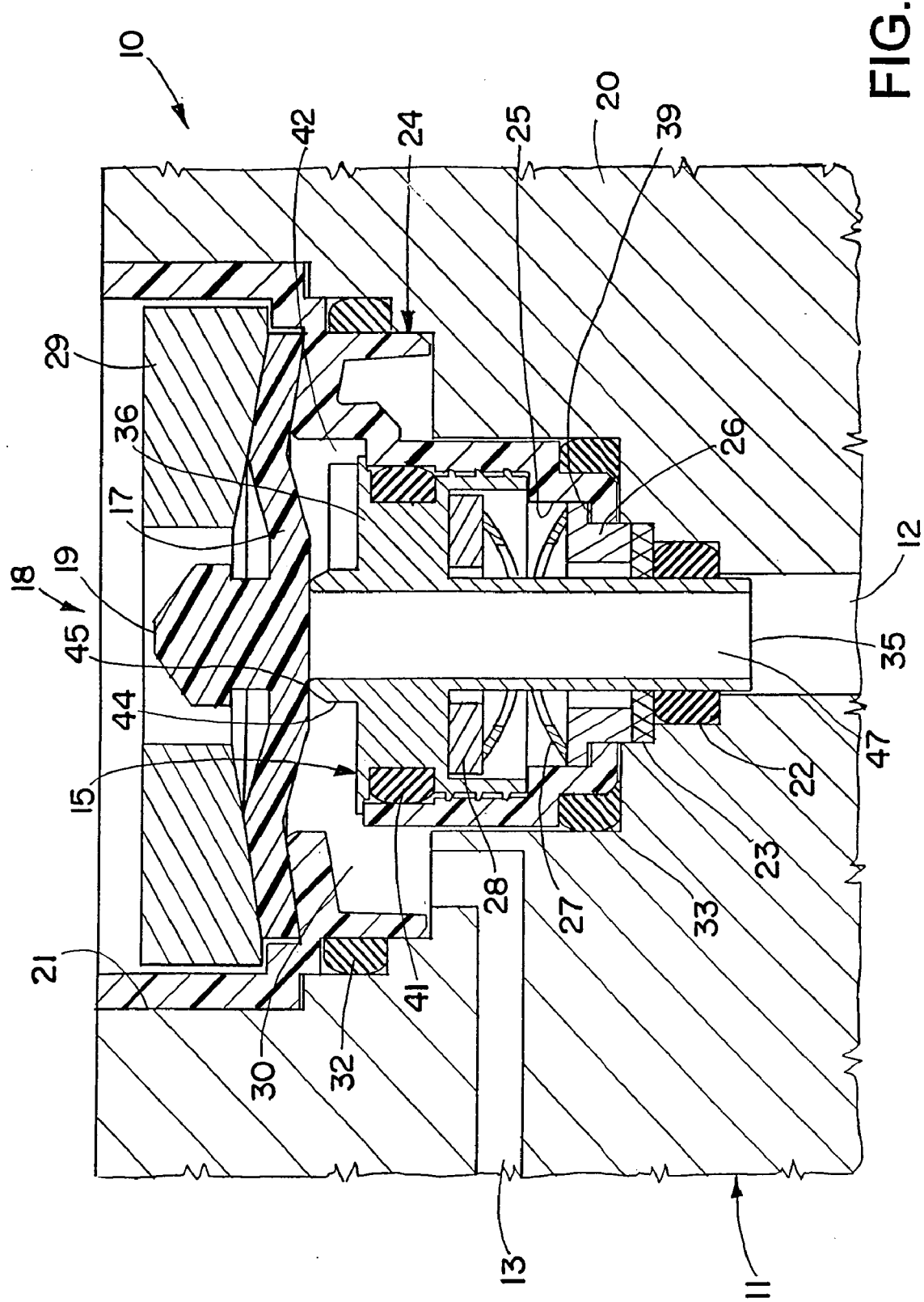
FIG. 1 is a cross-sectional view of an exemplary valve according to the invention.

Referring now in detail to the drawings and initially to FIG. 1, an exemplary valve according to the invention is designated generally by reference numeral 10. The valve 10 generally comprises a valve body 11 having a fluid inlet 12 and a fluid outlet 13. As will be appreciated by those skilled in the art, the valve may be used in systems where flow is from the fluid outlet to the fluid inlet, although for most freeze-proof applications flow will be from the fluid inlet to the fluid outlet.

A valve seat 15, which may also be referred to as a valve orifice, is located in the valve body 11 between the fluid inlet and the fluid outlet, and a valve member 17 is movable towards and away from the valve seat 15 for controlling the flow of fluid from the fluid inlet to the fluid outlet. The valve member 17 may be actuated by any suitable means such as by a solenoid, fluid pressure, etc., depending on the particular application. In most fuel cell applications, the valve member will be actuated by electromagnetic means, such as a solenoid or the like that may be controlled by the overall system controller. In the illustrated embodiment, the valve member 17 is a diaphragm valve that is sealed to the valve body 11 to prevent fluid such as water from entering the actuator 18. As will be appreciated, moisture inside the actuator could cause freeze-up of a solenoid armature or other actuating component. As shown, the diaphragm valve may be provided with an arrow-shape tab or button 19 that can be pressed into a correspondingly shaped socket in the end of a solenoid armature (not shown).

In the illustrated embodiment, the valve body 11 is composed of several parts including a housing structure 20 that may be part of an overall housing (e.g. a manifold block) containing various other components and/or flow passages in addition to those associated with the illustrated valve 10. The housing structure 20 includes a stepped chamber 21 for receiving various other components of the valve 10. The stepped chamber 21 is open at its lower end to the fluid inlet 12 and has assembled therein, going from bottom to top, a valve seat stem seal 22, an insulating support washer 23, and a valve body insert 24 that has a stepped interior chamber 25 in which other components of the valve are assembled and carried thereby. The components assembled in the valve body insert 24 include, going from bottom to top, an electrical contact 26, a resilient member 27, a heater 28, the valve seat 15, the valve member 17, and retention ring 29 that serves to hold the radially outer peripheral portion of the valve member (a diaphragm in the illustrated embodiment) in sealed engagement with the valve body, in particular the valve body insert thereby closing off the otherwise open end of the chamber 25 in the valve body insert.

The valve body insert 24 has recesses at opposite axial sides of a drain passage 30 leading to the fluid outlet 13, which recesses accommodate respective annular seals 32 and 33 that seal the valve body insert to the interior surface of the chamber 21 in the housing structure 20.

In the illustrated embodiment, the electrical contact 26, resilient member 27 and heater 28 are annular and telescoped over a valve seat stem 35 the depends from a main portion 36 of the valve seat 15. The main portion 36 may be externally threaded as shown for threaded receipt in a correspondingly threaded portion of the valve body insert 24. When the valve seat is threaded into the valve body insert, the electrical contact 26, resilient member 27 and heater 28 will be sandwiched between an annular bottom surface of the main portion 36 that surrounds the valve seat stem 35 and a radially inturned shoulder 39 at the lower end of the valve body insert. In addition, the resilient member 27 will be compressed whereby the electrical contact 26 will be resiliently biased against the insulating washer 23, and the heater will be resiliently biased against the underside of the main portion 36 of the valve seat. The valve seat may also have an annular recess for accommodating an annular seal 41 for sealing the valve seat to the valve body insert at a location between the fluid inlet 12 and an annular well 42 that surrounds an upwardly protruding portion 44 of the valve seat that terminates at a valve seat surface 45 that can be engaged by the valve member 17 to close the open upper end of an inlet passage 47 in the valve seat. As shown, the inlet passage 47 may extend axially to a lower end of the valve seat stem for communication with the fluid inlet 12, and the annular well 42 may be connected by the drain passage 30 to the fluid outlet 13.

As will be appreciated, the resilient member 27 will hold the heater 28 into intimate contact with the heater to establish a good thermally conductive path therebetween, and also to establish an electrically conductive path in the illustrated embodiment. In addition, the heater 28 will be located in close proximity to the valve seat surface 45 for localized heating that enables a reduction in power requirements and a reduction of thaw time. Moreover, the valve body insert 24 may be formed by a plastic or other thermally insulating material to minimize heat loss. Also, the resilient member 27 may be formed by one or more thin springs as shown that leave an air gap of significant size that further prevents the escape of heat.

In the illustrated embodiment, the heater 28 is of a type wherein the electrical contacts therefor are provided at opposite axial ends of the heater. This enables electrical connection of the heater to a power source through the valve seat 15 and the electrical contact 26 via the resilient member 27. If power is supplied in this manner, the valve seat at least in part is made of an electrically conductive material for making an electrical connection to one side of the heater. For example, the entire valve seat may be made of an electrically conductive material, and consequently an electrical lead can be connected to any convenient portion of the valve seat, such as to the valve seat stem 35. Likewise, the resilient member and the electrical contact may be made of an electrically conductive material, and a suitable power lead may connected conveniently to the electrical contact. By way of a specific example, the valve seat and electrical contact may be made of an electrically conductive metal such as electrically conductive steel, and the resilient member may be one or more electrically conductive springs, such as wave or Belleville springs.

The springs 27 and contact 26 of course should be electrically isolated from the valve seat 15 in this exemplary electrical circuit to prevent short circuits. As shown, the springs and contact are radially spaced from the valve seat stem 35. Electrical isolation of the valve seat in the illustrated embodiment is effected by the valve body insert 24 which is made of an electrically nonconductive material such as plastic. Similarly, the insulating support washer 23 may be made of an electrically insulating material such as plastic.

Those skilled in the art will appreciate that other arrangements may be used to effect electrical connection of the heater to an external power source, including other arrangements using one or more of the valve seat and resilient member as part of the electrical circuit that supplies power to the heater.

In a preferred embodiment, the heater 28 is a positive coefficient (PTC) heater such as a PTC pill of a commonly available type. Such a heater includes a material that exhibits a positive temperature coefficient such as barium strontium-titanate. Such material may have at least its upper surface covered with a heatsink material having high heat conductivity.

The temperature of the heater 28, and consequently the valve seat 15, is controlled by the heating value of the PTC heater/pill which has the property of increasing its electrical resistance with temperature so that the temperature cannot exceed a certain value. This advantageously provides efficient power management and further prevents overheating of the valve seat.

The illustrated valve 10 is particularly suited for use in a fuel cell system. In a drain valve application, fluid (e.g. water) flows upwardly through the inlet passage 47. When the valve is open, fluid can flow over the valve seat surface 45 and down into the well 42 for draining to the fluid outlet 13. As will be appreciated, the illustrated design is self-draining and thus reduces if not eliminates pooling of water around the valve seat surface.

During freezing conditions, electrical current can be passed through the valve seat 15 to the top side of the heater 28 and from the bottom side into the resilient member 27, such elements forming part of an electrical circuit. This will heat the valve seat locally near the source of the valve seat surface thereby melting any frozen water that could interfere with proper operation of the valve.

Figure 2:
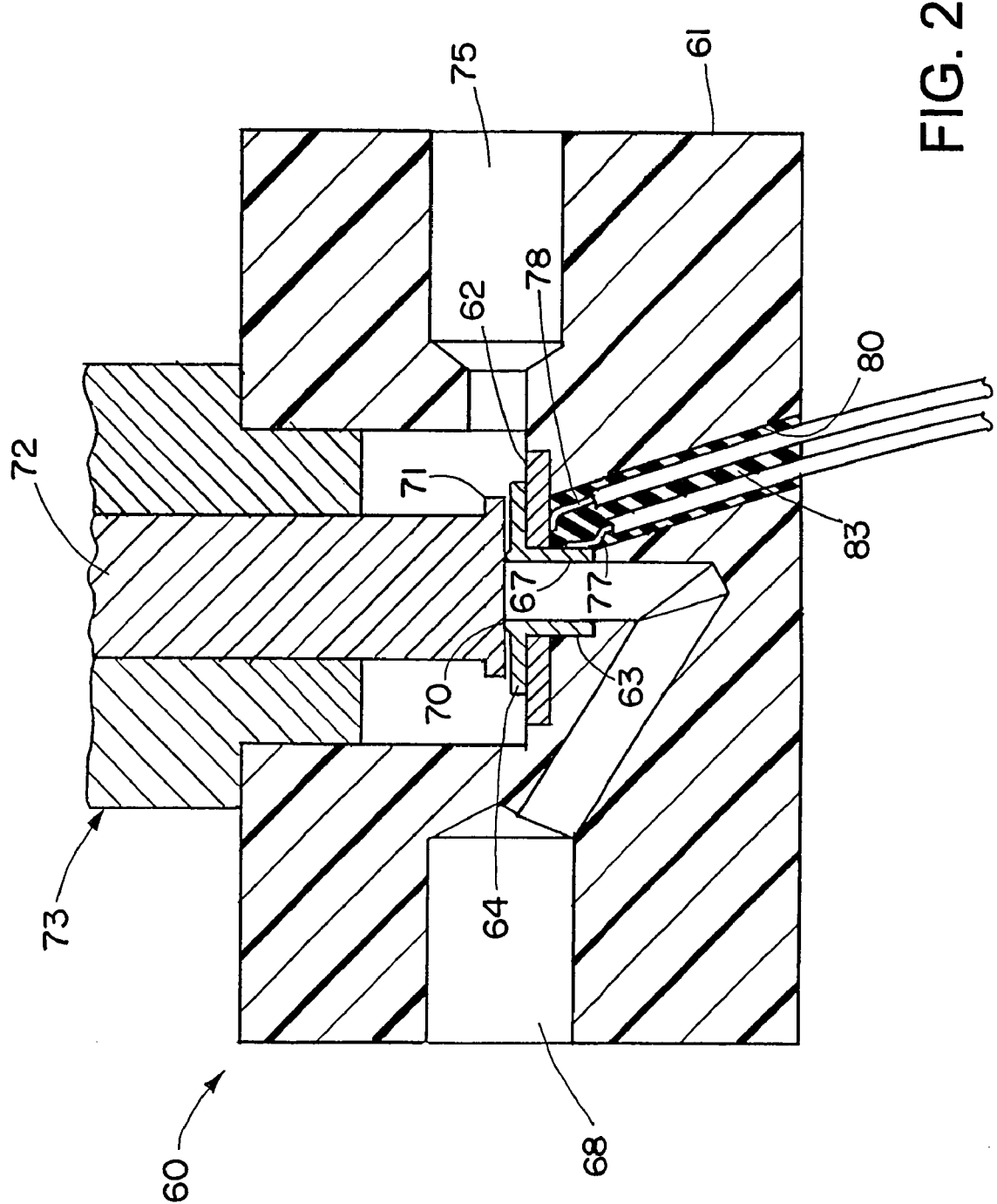
FIG. 2 is a cross-sectional view of another exemplary valve according to the invention.

As will be appreciated, other types of heaters and circuit configurations may be used, with FIG. 2 showing another exemplary valve 60 according to the invention. In this embodiment, a valve body 61 made of plastic includes a locating pocket for receiving a heater 62, in particular a PTC pill. The heater has a central aperture through which the stem 63 of a valve seat 64 extends. The valve seat is made of an electrically conductive material such as an electrically conductive metal and has an axially extending inlet passage 67. The inlet passage is connected at one end to a fluid inlet 68, while the other open end is surrounded by a raised annular valve seat surface 70 that can be engaged by a valve member 71 to open and close the valve. In the illustrated embodiment, the valve member is provided at the end of the plunger 72 of a solenoid 73 assembled to the valve body 61. When the valve member is unseated from the valve seat surface, fluid can flow from the inlet passage to a fluid outlet 75.

Power to the heater is supplied by power leads 77 and 78 that pass through a bore/passage 80 in the valve body 61. One lead 78 is connected by suitable means, such as by soldering, to the bottom side of the heater pill 62. The other lead 77 is connected to the valve seat stem 63 which electrically connects via the head portion of the valve seat to the top side of the heater pill. After the electrical connections have been made and the valve seat and heater are positioned in the valve body as shown, the bore/passage for the leads may be filled with a potting compound 83 that may surround and bond to insulation covering the leads 77 and 78.

Figure 3:
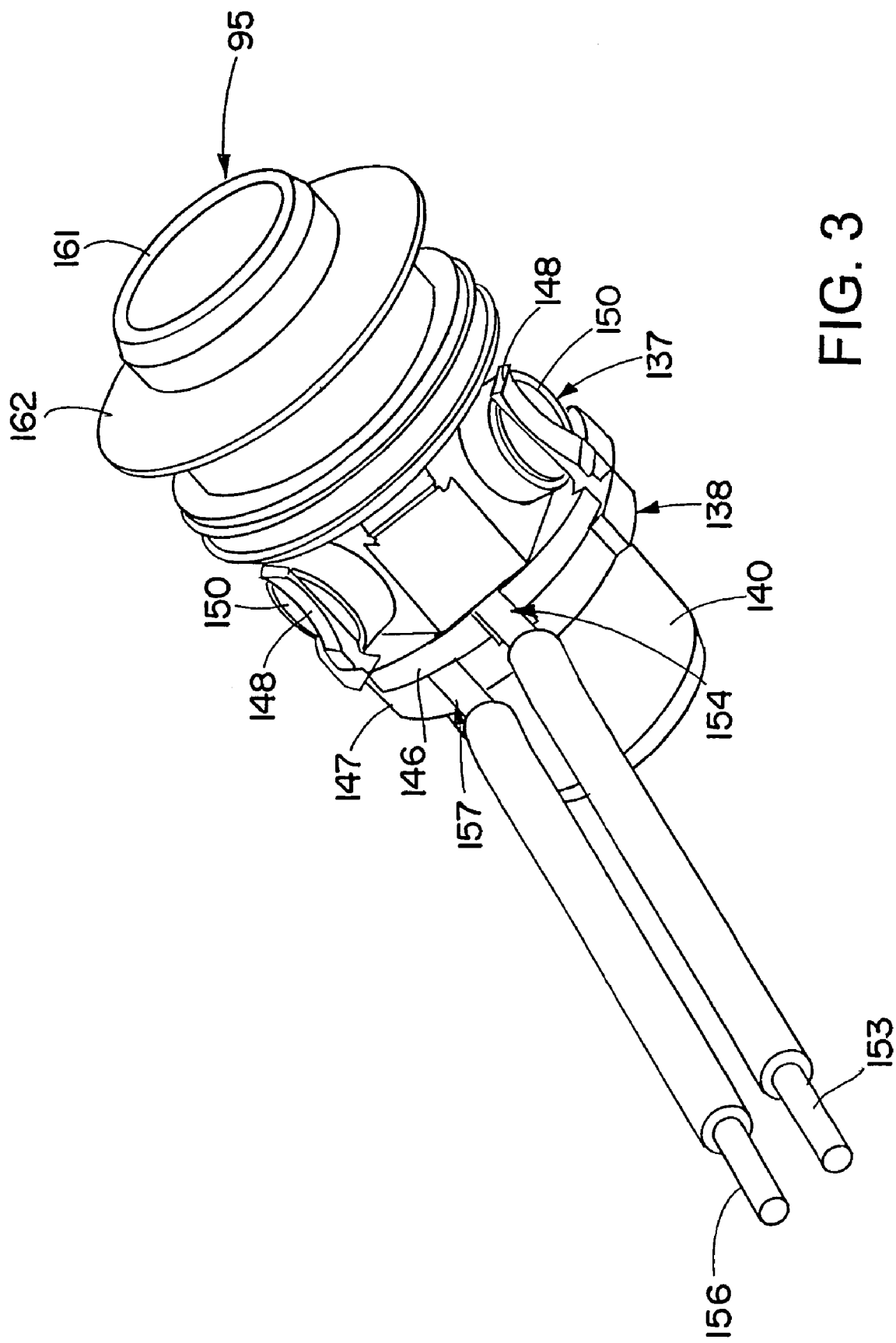
FIG. 3 is a perspective view of a valve seat subassembly according to the invention.
Figure 4:
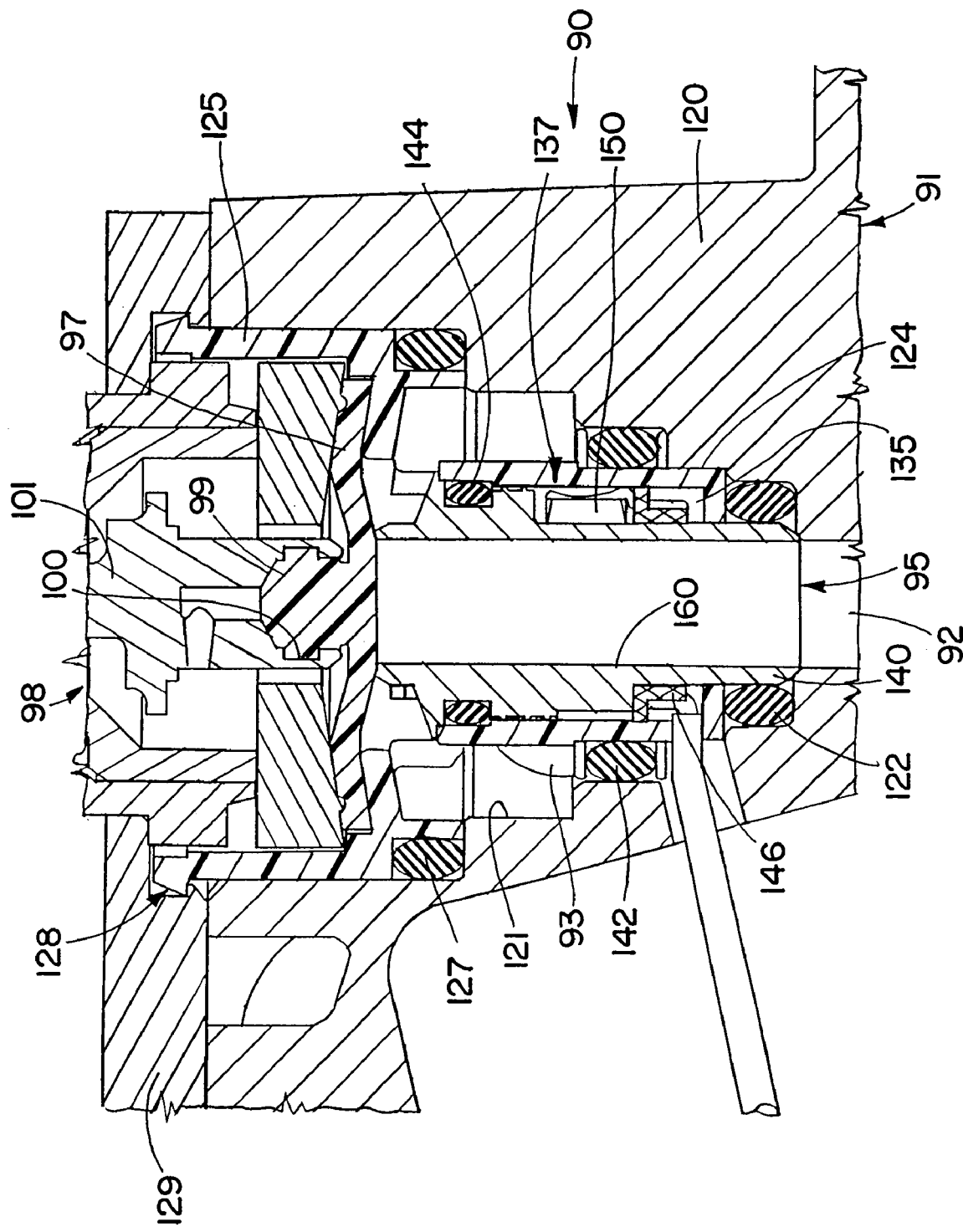
FIG. 4 is a cross-sectional view of a valve employing the valve seat subassembly of FIG. 3.

Turning now to FIGS. 3 and 4, another exemplary valve according to the invention is indicated generally at 90 (FIG. 4). Like the valve 10 shown in FIG. 1, the valve 90 generally comprises a valve body 91 having a fluid inlet 92 and a fluid outlet 93. As will be appreciated by those skilled in the art, the valve 90 may be used in systems where flow is from the fluid outlet to the fluid inlet, although for most freeze-proof applications flow will be from the fluid inlet to the fluid outlet.

A valve seat 95 is located in the valve body 91 between the fluid inlet and the fluid outlet, and a valve member 97 is movable towards and away from the valve seat 95 for controlling the flow of fluid from the fluid inlet to the fluid outlet. The valve member 97 may be actuated by any suitable means such as by a solenoid, fluid pressure, etc., depending on the particular application. In most fuel cell applications, the valve member will be actuated by electromagnetic means, such as a solenoid or the like that may be controlled by the overall system controller. The valve member 97, for example, is a diaphragm valve that is sealed to the valve body 91 to prevent fluid such as water from entering the actuator 98. The diaphragm valve may be provided with an arrow-shape tab or button 99 that can be pressed into a correspondingly shaped socket 100 in the end of a solenoid armature 101.

In the illustrated embodiment, the valve body 91 is composed of several parts including a housing structure 120 that may be part of an overall housing (e.g. a manifold block) containing various other components and/or flow passages in addition to those associated with the illustrated valve 90. The housing structure 120 includes a stepped chamber 121 for receiving various other components of the valve 90. The stepped chamber 121 is open at its lower end to the fluid inlet 92 and has assembled therein, going from bottom to top, a valve seat stem seal 122, a valve seat housing insert 124, and a valve body insert 125. The valve body insert 125 carries the valve member 97 and closes the outer end of the chamber 121. The valve body insert has an annular recess for an annular seal 127 that seals to the wall of the chamber 121. As shown, the valve body insert may have at the axially outer end thereof an attachment device 128, such as the illustrated catches for engaging a shoulder surface on a mounting plate 129 to which the actuator 98 may be connected. The valve seat housing insert in the illustrated embodiment is made of an electrically nonconductive material, in particular plastic, although any suitable material may be used.

The valve seat housing insert 124 has an interior chamber 135 in which other components of the valve are assembled and carried thereby, thereby forming the subassembly illustrated in FIG. 3. The components assembled in the valve seat housing insert 124 include the valve seat 95, a heater 137 and a heater clip 138 for holding the heater to the valve seat. In the illustrated embodiment, a tubular stem portion 140 of the valve seat protrudes from a bottom end of the valve seat housing insert 124 and is sealed to the housing structure by the seal 122. Another annular seal 142 also is provided to seal the valve seat housing insert to the housing structure 120. The valve seat housing insert may be secured in the housing structure by any suitable means, such as by press fitting of a lower axial end portion into a receiving portion of the housing structure. Likewise, the valve seat may be secured by any suitable means in the valve seat housing insert, such as by press fitting of a collar portion thereof into a corresponding receptacle portion of the valve seat housing insert. The valve seat may be provided with a recess for receiving an annular seal 144 that seals the valve seat to the valve seat housing insert.

In the illustrated embodiment, the heater clip 138 has an insulating portion 146 that may be press-fitted or otherwise assembled on the stem portion 140 of the valve seat 95, and an electrically conductive spring finger portion 147 attached to the insulating portion. The spring finger portion has one or more spring fingers 148 that hold respective heating elements 150 of the heater to the valve seat. As shown, the spring fingers may hold the heating elements to respective flats on the sides of the valve seat that may be provided with pockets for receiving and locating the heating elements.

As will be appreciated, the spring fingers 148 will hold the heater elements 150 in intimate contact with the valve seat to establish a good thermally conductive path therebetween, and also to establish an electrically conductive path in the illustrated embodiment. This provides for localized heating of the valve seat within the interior of the valve body, thereby enabling a reduction in power requirements and a reduction of thaw time. Moreover, the valve body insert 124 may be formed by a plastic or other thermally insulating material to minimize heat loss.

In the illustrated embodiment, the heater elements 150 are of a type wherein the electrical contacts therefor are provided at opposite axial ends. This enables electrical connection of each heater element to a power source through the valve seat 95 and the heater clip 138 via the respective spring finger 148. If power is supplied in this manner, the valve seat at least in part is made of an electrically conductive material for making an electrical connection to one side of each heater element. If desired, the entire valve seat may be made of an electrically conductive material, and consequently an electrical lead 153 can be connected to any convenient portion of the valve seat, such as to the valve seat stem as seen at 154 in FIG. 3. Likewise, the spring finger portion of the heater clip may be made of an electrically conductive material, and a suitable power lead 156 may connected conveniently to the clip portion of the clip as seen at 157 in FIG. 3. By way of a specific example, the valve seat and spring finger portion may be made of an electrically conductive metal such as electrically conductive steel.

In a preferred embodiment, the heater elements 150 are positive coefficient (PTC) heater elements such as a PTC pills of a commonly available type. Such heater elements includes a material that exhibits a positive temperature coefficient such as barium strontium-titanate. The temperature of the heater, and consequently the valve seat 15, is controlled by the heating value of the PTC heater/pill which has the property of increasing its electrical resistance with temperature so that the temperature cannot exceed a certain value. This advantageously provides efficient power management and further prevents overheating of the valve seat.

The illustrated valve 90 is particularly suited for use in a fuel cell system. In a drain valve application, fluid (e.g. water) flows upwardly through an inlet passage 160 in the valve seat. When the valve is open, fluid can flow over a valve seat surface 161 and down along a downwardly sloped skirt portion 162 of the valve seat that overlaps the upper end of the valve seat housing insert for draining to the fluid outlet 13. As will be appreciated, the illustrated design is self-draining and thus reduces if not eliminates pooling of water around the valve seat surface.

During freezing conditions, electrical current can be supplied to the heater for melting any frozen water that could interfere with proper operation of the valve.

The foregoing exemplary embodiments are simply that, i.e. examples of how the principles of the invention can be applied for particular applications. As above indicated, the valve has particular application in fuel cell systems, such as for use as a drain valve. Valves in accordance with the invention may have other applications such as for use as vent valves, particularly where water or water vapor may be vented through the valve.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising a valve body having a fluid inlet and fluid outlet, a valve seat located in the valve body between the fluid inlet and the fluid outlet, a valve member movable towards and away from the valve seat for controlling the flow of fluid from the fluid inlet to the fluid outlet, and a heater in thermal contact with the valve seat for heating the valve seat, wherein the heater includes a PTC heater element, the heater is in electrically conductive contact with the valve seat, the heater is biased against the valve seat by a resilient member, and the heater, valve seat and resilient member form part of an electrical circuit for powering the PTC heater.

2. A valve according to claim 1, wherein the valve seat is secured within a chamber in the valve body, and the valve body is made of an electrically nonconductive material.

3. A valve according to claim 1, wherein the valve seat has an inlet passage connected to the fluid inlet, and heater includes one or more heater elements surrounding the inlet passage.

4. A valve according to claim 1, wherein the valve seat has an upwardly protruding portion terminating at a valve seat surface surrounding an upper end of the inlet passage, the valve seat surface is located at a higher elevation than the bottom of an annular well surrounding the upwardly protruding portion, and the well is connected by a drain passage to the fluid outlet.

5. A valve according to claim 1, wherein the valve seat and valve body are formed as separate pieces, and the valve body is formed from an electrically nonconductive material.

6. A valve according to claim 1, wherein the heater is disposed interiorly of the valve body.

7. A valve according to claim 1, wherein the heater is contiguous with the valve seat.

8. A valve according to claim 1, wherein the valve body has a chamber, the valve seat is formed as a separate element secured in the chamber, and the heater is disposed within the chamber between the valve seat and the valve body.

9. In a fuel cell system, a valve according claim 1.

10. A method for thawing a valve, comprising the steps of applying heat to a valve seat by means of a heater located interiorly of the valve, wherein the heater includes a PTC heater element, the heater is in electrically conductive contact with the valve seat, the heater is biased against the valve seat by a resilient member, and the heater, valve seat and resilient member form part of an electrical circuit for powering the PTC heater.

* * * * *